M. LOEWENSTEIN.
TEA STRAINER.
APPLICATION FILED MAY 25, 1914.
1,192,332.
Patented July 25, 1916.
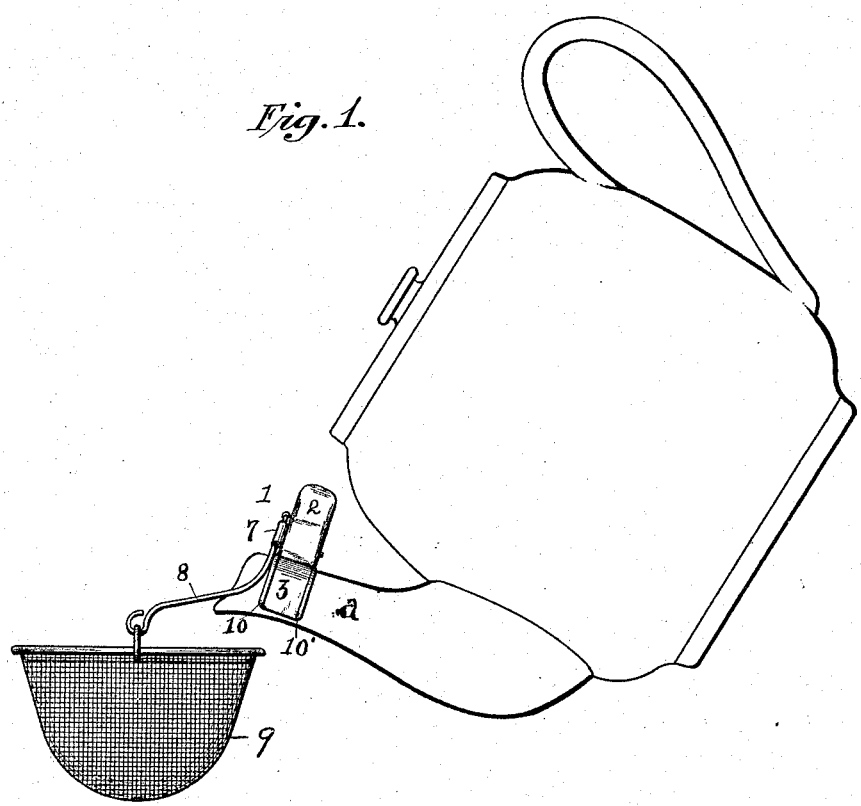
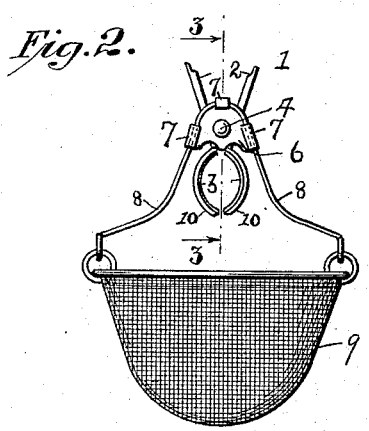
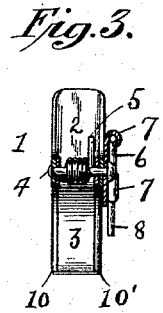
Attest:
Max Loewenstein,
Inventor:
by Robt B Kilgore
Atty

UNITED STATES PATENT OFFICE.

MAX LOEWENSTEIN, OF NEW YORK, N. Y.

TEA-STRAINER.

1,192,332.　　　　Specification of Letters Patent.　　Patented July 25, 1916.

Application filed May 25, 1914. Serial No. 840,809.

*To all whom it may concern:*

Be it known that I, MAX LOEWENSTEIN, a citizen of the United States, and a resident of the city, county, and State of New York, have invented a new and useful Improvement in Tea-Strainers, of which the following is a specification.

My invention relates to the manner of suspending the usual strainer basket from the spout of a tea pot or other vessel and my object is the production of a cheap and substantial clasp and suspending device which will be neat in appearance, free from complications and from which the basket will always hang in proper position.

In the drawing Figure 1 is a view of the strainer on a tea pot; Fig. 2 a front view of the strainer; and Fig. 3 a sectional view on the line 3—3 of Fig. 2.

The clip 1, adapted to engage the spout of a tea pot, has the finger parts 2—2 and grip parts 3—3 hinged together by a pin 4, a spring 5 forcing the grip parts together. A swivel plate 6, provided with ears 7—7 is rotatably mounted on the hinge pin 4, the ears engaging and retaining the bail 8. The outer ends of the bail 8 engage the strainer basket 9.

In use the clip 1 is grasped by the finger parts 2—2 and the grip parts 3—3 are placed around the spout *a* the spring 5 holding the clip in position. This brings the basket under the spout as shown in Fig. 1, the swing on the outer end of the bail and the swiveling of the plate 6 on the clip always maintaining the basket 9 in proper position.

The clip is preferably beveled or flared at the edges 10—10′ to prevent defacing of the spout of a metal tea pot.

I claim:—

1. In a strainer the combination of a clip adapted to engage the spout of a vessel, a plate pivotally mounted thereon, a bail rigidly secured to the plate and a strainer basket secured to the outer end of the bail whereby the basket may position itself in the path of the poured liquid.

2. In a strainer, a clip composed of two members, a hinge pin holding the members together; a swivel plate rotatably mounted on the hinge pin, a bail secured to the swivel plate and a strainer basket secured to the outer ends of the bail.

3. In a strainer the combination of a clip composed of two members hinged together, the gripping jaws being flared at the edges, means for pressing said jaws together, a bail pivotally secured to the clip and a strainer basket on the outer ends of the bail.

4. A tea strainer having a clasp including a pair of jaws pivoted on a pin; a support pivoted on said pin; and a strainer carried by said support.

In testimony whereof I have hereunto subscribed my name in the presence of two attesting witnesses.

MAX LOEWENSTEIN.

Witnesses:
　ROBT. B. KILLGORE,
　IRVING KATZ.

Copies of this patent may be obtained for five cents each, by addressing the "Commissioner of Patents, Washington, D. C."